US008001175B2

(12) United States Patent  (10) Patent No.: US 8,001,175 B2
Betancourt et al.  (45) Date of Patent: Aug. 16, 2011

(54) FACILITATING SERVER RESPONSE OPTIMIZATION

(75) Inventors: Michel Betancourt, Durham, NC (US);
Bijal D. Patel, Morrisville, NC (US);
Dipak M. Patel, Morrisville, NC (US);
Joseph Spano, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 2063 days.

(21) Appl. No.: 10/904,090

(22) Filed: Oct. 22, 2004

(65) Prior Publication Data

US 2006/0090033 A1   Apr. 27, 2006

(51) Int. Cl.
*G06F 15/16* (2006.01)
(52) U.S. Cl. ........ 709/203; 709/224; 709/246; 711/118; 455/72
(58) Field of Classification Search .......... 709/203, 709/224, 246; 711/118; 395/200.33; 455/72
See application file for complete search history.

(56) References Cited

U.S. PATENT DOCUMENTS

| | | | |
|---|---|---|---|
| 4,481,602 A | | 11/1984 | Bohrer et al. |
| 5,371,547 A | | 12/1994 | Siracusa et al. |
| 5,852,717 A | * | 12/1998 | Bhide et al. ............... 709/203 |
| 5,949,355 A | | 9/1999 | Panaoussis |
| 6,130,888 A | | 10/2000 | Tsuboya et al. |
| 6,233,542 B1 | | 5/2001 | Butts et al. |
| 6,567,914 B1 | | 5/2003 | Just et al. |
| 6,654,810 B1 | | 11/2003 | Pierre et al. |
| 6,671,719 B2 | | 12/2003 | Weber |
| 6,701,353 B1 | | 3/2004 | Block |
| 6,766,147 B2 | | 7/2004 | O'Hare et al. |
| 6,772,106 B1 | * | 8/2004 | Mahlke et al. ............... 703/21 |

(Continued)

FOREIGN PATENT DOCUMENTS

JP    11-194922 A    7/1999

OTHER PUBLICATIONS

IBM Research Disclosure Article 429134, Dynamic Generation of Rules from Properties to Improve Rule Processing Performance, p. 172. Jan. 2000.

*Primary Examiner* — Thuong T Nguyen
(74) *Attorney, Agent, or Firm* — Lee Law, PLLC; Christopher B. Lee

(57) ABSTRACT

An algorithm facilitates optimization functionality for generating optimized response information. In facilitating such optimization, non-essential elements of the response information (i.e., unneeded for system interpretation) are eliminated thereby reducing the size of the response information and generating optimized response information as well as reducing the memory footprint of cache required for storing such optimized response information. Examples of such non-essential elements of response information include, but are not limited to, indention characters, tab characters, blank space characters and the like. Such optimization functionality is tailored to optimizing the size of response information being transmitted from a server. More specifically, it provides for reduction in bandwidth occupied by outgoing response information from a transmitting a server. Examples of such response information include, but are not limited to, HTML formatted information, XML formatted information, JavaScript formatted information and SOAP formatted information. Advantageously, this optimization functionality is configured in a manner whereby it does not increase the load on the resource utilization, thereby providing an overall and desirable improvement in network performance.

1 Claim, 4 Drawing Sheets

U.S. PATENT DOCUMENTS

| | | |
|---|---|---|
| 6,834,297 B1* | 12/2004 | Peiffer et al. .................. 709/219 |
| 7,188,145 B2* | 3/2007 | Lowery et al. ................. 709/214 |
| 7,437,364 B1* | 10/2008 | Fredricksen et al. ........... 707/10 |
| 2003/0120752 A1* | 6/2003 | Corcoran ....................... 709/219 |
| 2003/0158842 A1* | 8/2003 | Levy et al. ........................ 707/3 |
| 2003/0236857 A1* | 12/2003 | Takase et al. ................. 709/217 |
| 2004/0044731 A1* | 3/2004 | Chen et al. .................... 709/203 |
| 2004/0168122 A1* | 8/2004 | Kobipalayam Murugaiyan ................. 715/513 |
| 2005/0050066 A1* | 3/2005 | Hughes ......................... 707/100 |
| 2005/0288920 A1* | 12/2005 | Green et al. ....................... 704/3 |
| 2006/0056412 A1* | 3/2006 | Page ............................. 370/392 |

\* cited by examiner

Accessing Cached Response Information
110

↓

Determining Character Omission Rule
120

↓

Removing Valid Optimizable Character(s)
130

↓

Caching Optimized Response Information
140

FACILITATING SERVER RESPONSE OPTIMIZATION

FIELD OF THE DISCLOSURE

The disclosures made herein relate generally to computer networks and computer-implemented methodologies configured for improving server response performance and, more particularly, to facilitating compression of response information.

BACKGROUND

Conventionally, the responsibility for optimizing information representing responses to requests on a network (i.e., response information) to enhance network performance lay on the shoulders of developers. Examples of such response information include, but are not limited to, Hypertext Markup Language (HTML) formatted information, Extensible Markup Language (XML) formatted information, JavaScript formatted information and Simple Object Access Protocol (SOAP) formatted information. In order to minimize the amount of data being transmitted back and forth between client and server, the developer has the responsibility of optimizing such response information (e.g., HTML files) to remove any unneeded information such as, for example, blank space characters, new line characters, comments, tab characters, etc. This is normally not done because this information removal activity adversely impacts human readability of the code, which makes the response information less serviceable (e.g., more difficult to debug).

SUMMARY OF THE DISCLOSURE

Optimization functionality in accordance with the inventive disclosures made herein is tailored to optimizing the size of cached response information (e.g., response information stored in dynamic cache) being transmitted from a server (e.g., an application server). More specifically, it provides for reduction in bandwidth occupied by outgoing cached response information from a transmitting system (e.g., a server). Examples of such cached response information include, but are not limited to, Hypertext Markup Language (HTML) formatted information, Extensible Markup Language (XML) formatted information, JavaScript formatted information and Simple Object Access Protocol (SOAP) formatted information. Advantageously, this optimization functionality is configured in a manner whereby it does not significantly increase the load on the resource utilization (e.g., CPU utilization), thereby providing overall improvement in network performance.

A processor of the server facilitates optimization of cached response information when the processor is sufficiently idle, thereby generating optimized response information. Such optimized response information is defined herein to be cached response information that has been optimized in accordance with the inventive disclosures made herein. Advantageously, this approach allows idle and, otherwise, wasted processor cycles to be used for performing optimization functionality on cached response information. Accordingly, this approach to optimizing cached response information by using idle processor cycles further enhances resource utilization.

In preferred embodiments, an algorithm facilitates the optimization functionality for generating optimized response information by abstracting optimization functionality from cached response information itself. A rules-based engine is an example of such an algorithm. Cached response information is programmatically optimized based upon the rules (e.g., as defined in a property.xml file). In facilitating such optimization functionality, non-essential elements of the cached response information (i.e., information unneeded for correct interpretation by a receiving entity) is eliminated thereby reducing the size of the cached response information. Examples of such non-essential elements of the cached response information include, but are not limited to, indention characters, tab characters, blank space characters and the like. It will be appreciated by a skilled person that a character in the context of the disclosures made herein may be a string of characters (i.e., a functional character) rather than a single character.

For providing further benefit, optimized response information is cached. In doing so, enhanced network performance is afforded in association with subsequent requests for the optimized response information. Specifically, caching of optimized response information provides for faster response times, frees up network bandwidth and reduces the memory footprint of cache required for storing the optimized response information. In preferred embodiments of such caching, optimized information is flagged such that identification and optimization of non-optimized resource information may be performed in a time-efficient manner.

Still another benefit of optimization functionality in accordance with the disclosures made herein is that it precludes time-consuming special requirements that are sometimes imposed on developers for providing code in a format that optimizes bandwidth utilization. Thus, developers can continue to code in a manner that utilizes non-essential instances of characters for enhancing readability and serviceability. Optimization functionality in accordance with the inventive disclosures made herein is implemented for optimizing this code (i.e., response information) upon transmission and/or caching rather than during its development.

BRIEF DESCRIPTION OF THE DRAWING FIGURES

DETAILED DESCRIPTION OF THE DRAWING FIGURES

Figure 1:
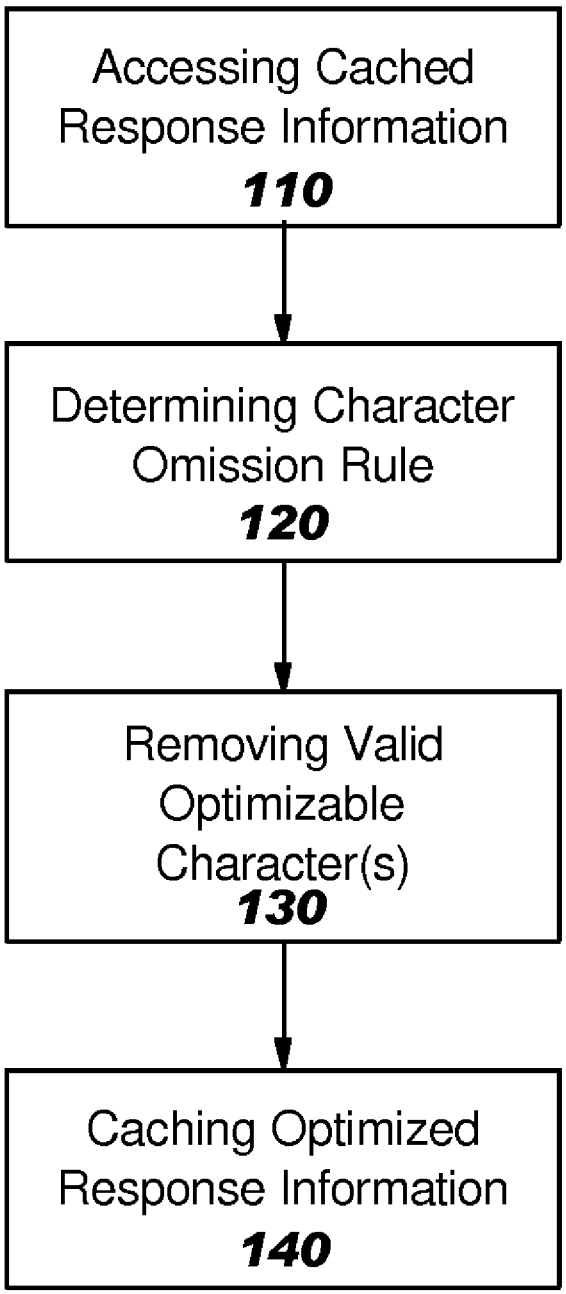
FIG. 1 depicts an embodiment of a method configured for facilitating optimization functionality in accordance with the inventive disclosures made herein.

FIG. 1 depicts an embodiment of a method (generally referred to herein as method 100) configured for facilitating optimization functionality in accordance with the inventive disclosures made herein. Operation 110 is performed for accessing cached response information, such as from within dynamic cache of a server. Messages in any number of formats (e.g., XML, Java Script, SOAP, HTML) that comprise requested information (e.g., content) are examples of the response information.

After accessing the cached response information, operation 120 is performed for determining a character omission rule dependent upon the response information. In one embodiment, the character omission rule is preferably selected from a group of available character omission rules. For example, a single property.xml file can govern optimization of a variety of types of data (e.g. HTML, Java script, XML, SOAP, etc). Advantageously, data optimization is advantageously abstracted from the response information itself. In response to determining the character omission rule, operation 130 is performed for removing one or more instances of an optimizable character from the cached response information in accordance with the character omission rule. In doing so, the response information is optimized (i.e., optimized response information). As this optimization functionality is applied to only information residing in cache, the original information (e.g., a data file) is unaffected and, hence, there are no issues with serviceability.

The one or more instances of the optimizable character that is omitted represent non-essential instances of the optimizable character (i.e., non-essential elements of the response information), which do not affect how the receiving system interprets the response information. For example, when a programmer creates a web page using HTML and Java script, it typically contains unnecessary tab characters, new line characters, space characters and the like (i.e., non-essential instances of optimizable characters) that are not required by a browser to correctly interpret the web page. The reason those non-essential instances of optimizable characters exist is to enhance human readability for purposes such as de-bugging. After removing the non-essential instances of optimizable characters, the output on the browser appears and/or functions the same as with the non-essential instances of optimizable characters. Undesirably, however, the non-essential instances of optimizable characters count as valid data at network level and hence occupy network bandwidth during transmission. Because the client does not need these characters for correct interpretation, no additional processing (or associated software) is required at a client to correctly interpret the optimized response information.

Character omission rules (e.g., an optimizable character and associated valid removal conditions) are defined by the specification of the message being sent from one entity to another. Accordingly, for the vast number of response message types, there is considerable variation in the approaches available for optimizing such messages in accordance with the inventive disclosures made herein. For this reason, in implementing optimization of response information in accordance with the inventive disclosures made herein, the amount of resources required to optimize must be balanced with the associated degree of optimization. This consideration will be more fully appreciated in view of the examples presented below.

Operation 140 is subsequently performed for caching the optimized response information. By caching the optimized response information, enhanced network performance is afforded in association with subsequent requests for the optimized response information. Specifically, caching of optimized response information, which is of a smaller file size relative to its original format, provides for faster response times and frees up network bandwidth.

Figure 2:
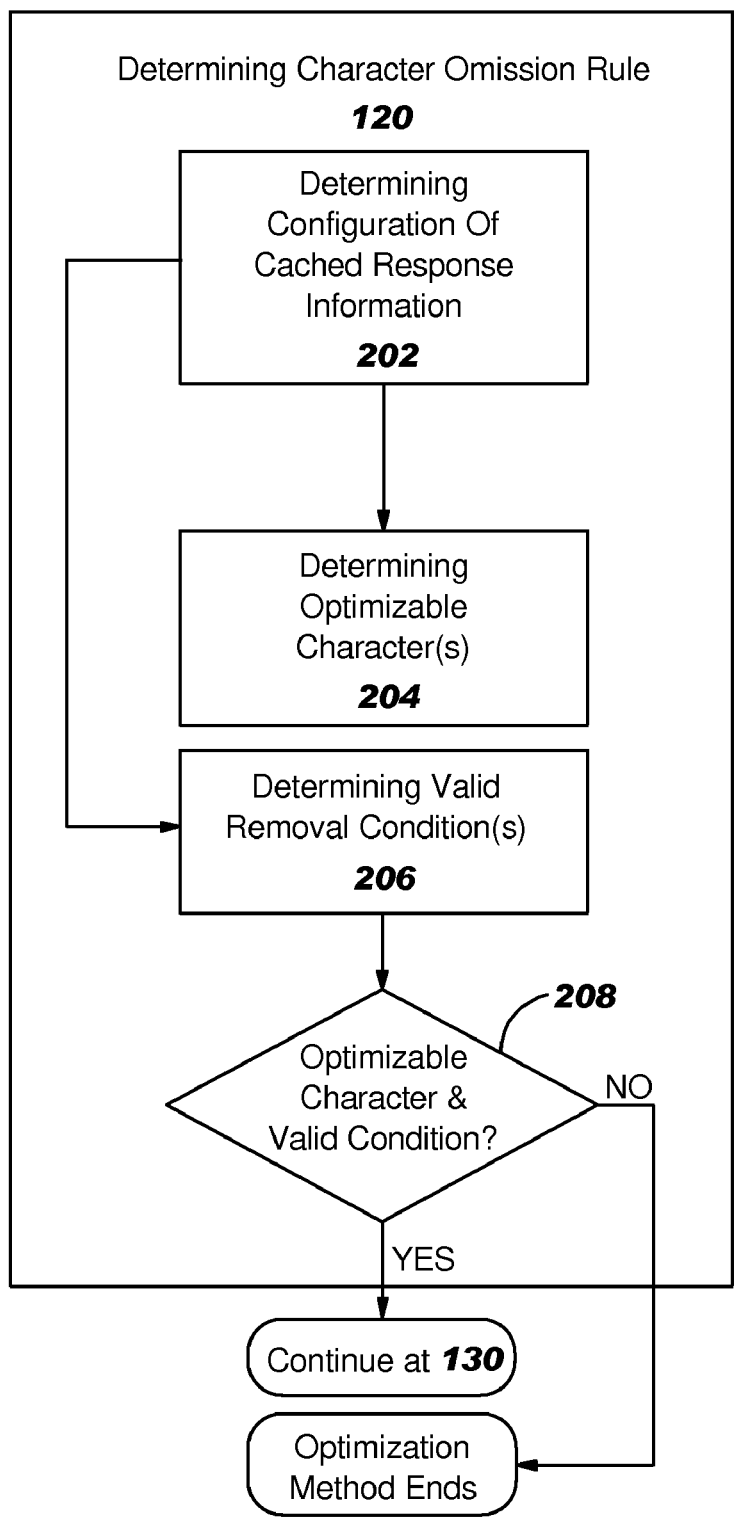
FIG. 2 depicts an embodiment of the operation depicted in FIG. 1 for determining a character omission rule.

FIG. 2 depicts an embodiment of operation 120 for determining a character omission rule. Step 202 is performed for determining a configuration (e.g., a specification) of the cached response information. Examples of configurations of cached response information include, but are not limited to, Hypertext Markup Language (HTML) formatted information, Extensible Markup Language (XML) formatted information, JavaScript formatted information and Simple Object Access Protocol (SOAP) formatted information. After determining the configuration, step 204 is performed for determining one or more characters for omission (i.e., optimizable character(s)) and step 206 is performed for determining one or more conditions under which omission of the optimizable character or characters is valid (i.e., valid omission condition(s)). Accordingly, in at least one embodiment, character omission rules include a first part that specifies an optimizable character for omission and a second part that specifies a valid condition for omitting that optimizable character.

In response to a decision being made at decision operation 208 that an optimizable character and valid condition have been determined, method 100 continues at operation 130. Otherwise, method 100 ends.

Figure 3:
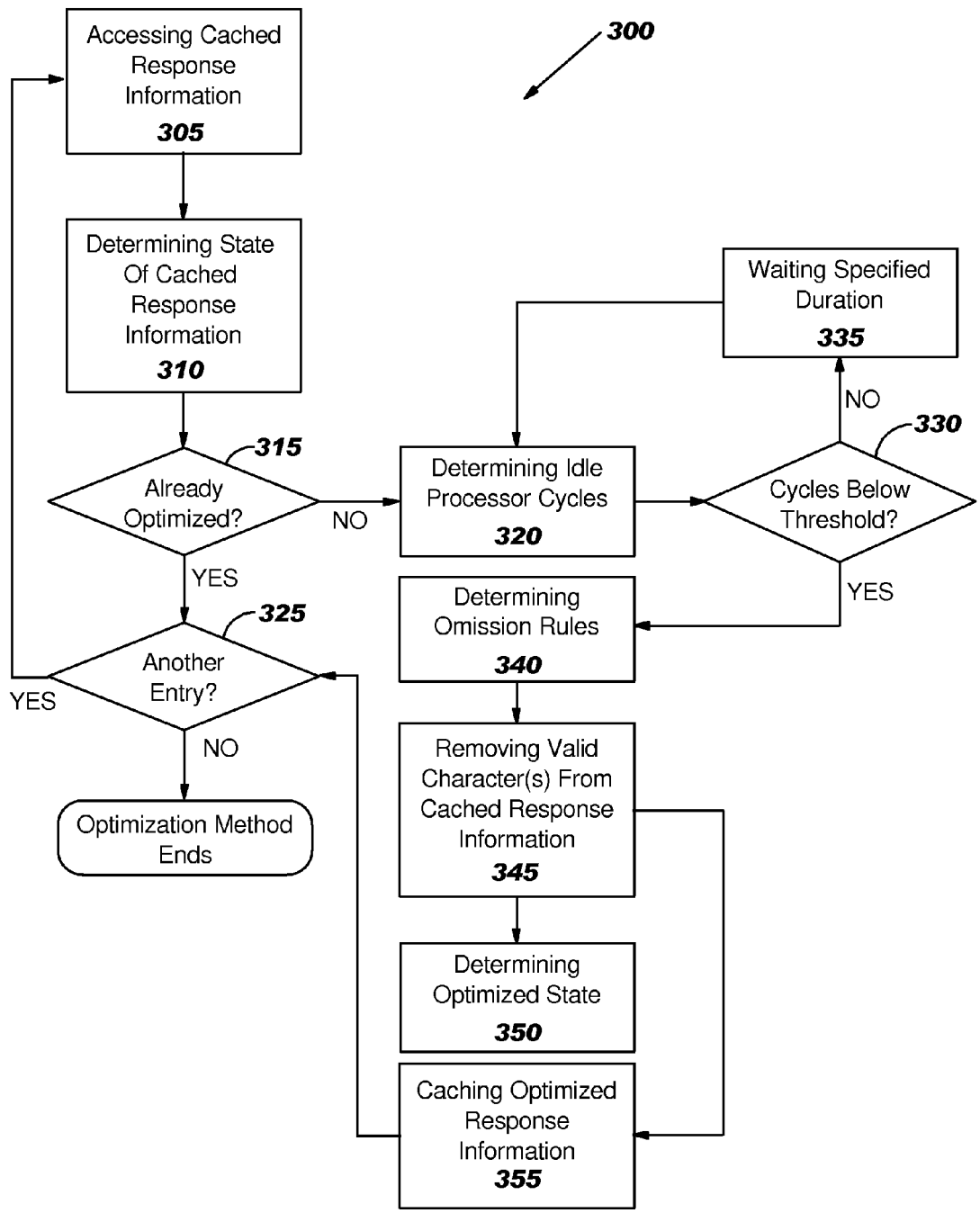
FIG. 3 depicts an embodiment of a method configured for selectively facilitating optimization functionality for cached response information in accordance with the inventive disclosures made herein.

Referring now to FIG. 3, an embodiment of a method (generally referred to herein as method 300) configured for selectively facilitating optimization functionality for cached response information in accordance with the inventive disclosures made herein is depicted. Operation 305 is performed for accessing cached response information, such as from within dynamic cache of a server. After accessing the cached response information, operation 310 is performed for determining a state (i.e., optimized state or non-optimized state) of the cached response information. In one embodiment, determining the state of the cached response information includes assessing an optimization bit (i.e., an optimization identifier) associated with each cached response information entry (e.g., each cached file). Any cached response information entries that are optimized are flagged with a 1 (i.e., a optimized designation) and cached response information entries that are non-optimized are flagged with a 0 (i.e., a non-optimized designation).

In response to the cached response information entry being determined to be non-optimized (e.g., its optimization bit set to designate a non-optimized state) at decision operation 315, method 300 continues at operation 320 for determining a current number of idle processor cycles. Otherwise, method 300 continues at decision operation 325 where a decision is made whether or not another cached response information entry exists (i.e., the next cached response information entry). If another cached response information entry exists, method 300 continues at operation 305 for accessing the next cached response information entry.

In response to a decision being made at decision operation 330 that the current number of idle processor cycles is not below the prescribed processor cycle threshold, operation 335 is performed for waiting a specified duration of time followed by the method 300 continuing with operation 320 being performed for determining the current number of idle processor cycles. Otherwise, operation 340 is performed for determining a character omission rule dependent upon the current cached response information entry. After determining the character omission rule at operation 340, operation 345 is performed for removing one or more instances of an optimizable character from the current cached response information entry in accordance with the character omission rule (i.e., assuming an optimizable character and a valid omission condition exist). After removing the one or more instances of the optimizable character from the cached response information, operation 350 is performed for designating the current cached response information entry as being optimized and operation 355 is performed for caching the optimized response information, which may include deleting or overwriting corresponding non-optimized cached response information. Such designation that the current cached response information entry can be made by, for example, setting an optimization bit of the current cached response information entry to designate an optimized state.

After caching the optimized response information at operation 355, the method 300 then continues at decision operation 325 where a decision is made whether or not another cached response information entry exists (i.e., the next cached response information entry). If another cached response information entry exists, method 300 continues at operation 305 for accessing the next cached response information entry. Otherwise, method 300 ends.

Advantageously, this approach allows idle and, otherwise, wasted processor cycles to be used for performing optimization functionality on cached response information (e.g., stored in the dynamic cache). As can be seen, method 300 facilitates optimization functionality on cached, non-optimized response information entries whenever the processor is sufficiently idle. Accordingly, method 300 allows non-optimized cached response information entries to be optimized either before being sent to a requester if there is enough idle processor cycles are available or after being sent to the requester once a sufficient number of idle processor cycles become available. Optionally, optimization functionality may be configured such that all response information is optimized prior to being transmitted to a client in response to a request for such response information. In optimizing the response information, overhead associated with such optimization preferably does not exceed the overhead of transmitting the response information in non-optimized format and preferably there is no significant overhead associated with optimizing response information residing in cache.

Figure 4:
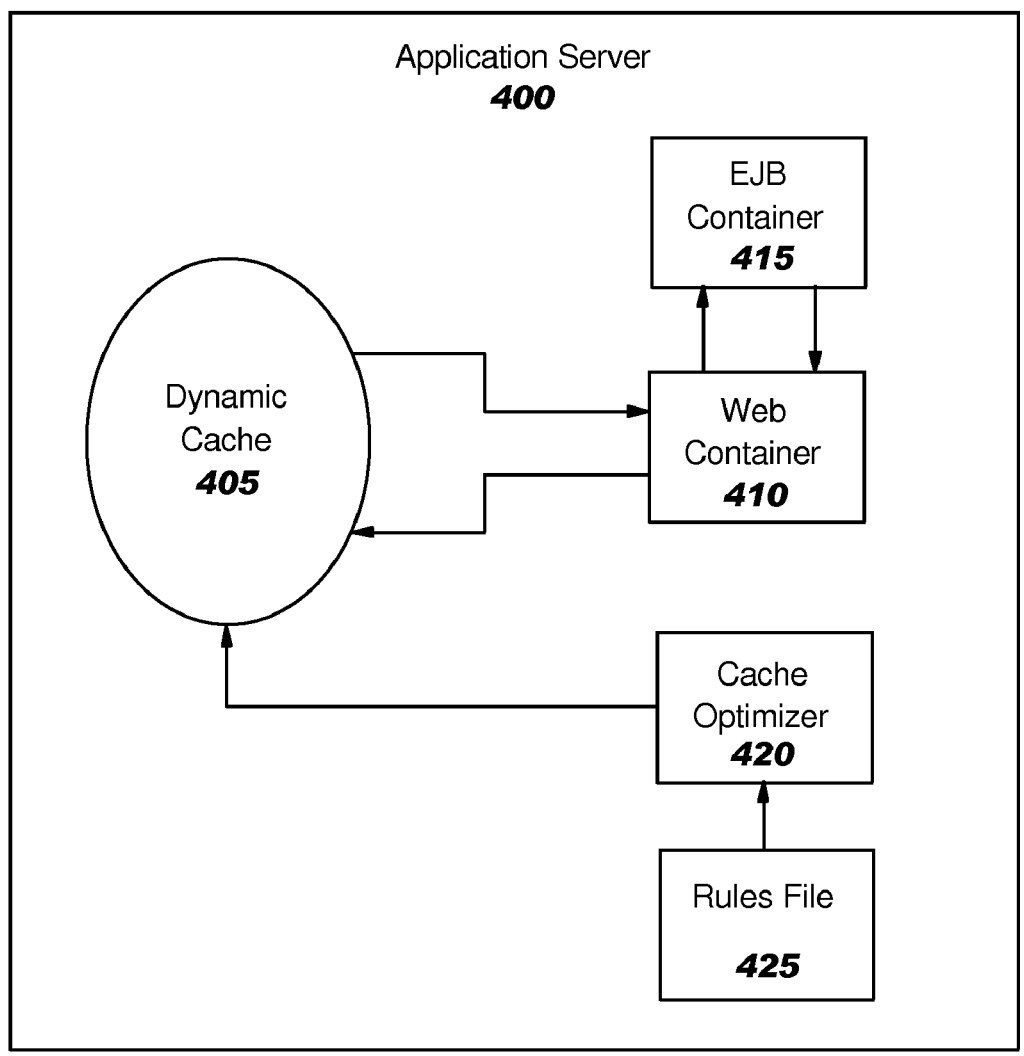
FIG. 4 depicts an embodiment of an application server configured for facilitating optimization functionality in accordance with the inventive disclosures made herein.

FIG. 4 depicts an embodiment of an application server (generally referred to as application server 400) configured for facilitating optimization functionality in accordance with the inventive disclosures made herein. Application server 400 is an example of a data processing system configured for facilitating optimization functionality in accordance with the inventive disclosures made herein. Application server 400 includes dynamic cache (i.e., dynamic cache 405), a web container (i.e., web container 410), an Enterprise JavaBean™ container (i.e., EJB container 415), a cache optimizer (i.e., cache optimizer 420) and a rules file (i.e., rules file 425). Web container 410 and cache optimizer 420 interact directly with dynamic cache 405. EJB container 415 interacts directly with web container 410 and rules file 425 is accessible by cache optimizer 420.

Web container 410 comprises a set of application program interface (APIs) and runtime environment that allows the execution of application code. The API's and runtime environment are configured for generating documents such as HTML, XML and other formats, which are typically passed to a client (end-user) via, for example, a browser. EJB container 415 comprises a set of APIs and runtime environment that is typically used to connect to backend systems such as databases or legacy systems and provide data such that a client can process it and display the data. Dynamic cache 405 is a caching mechanism for content of web container 410. Web container 410 and EJB container 415 typically work together to provide results to its end-user or client. A client can be a web container client, but it is not intended to be or required to be limited to this.

Cache optimizer 420 includes a set of instructions (i.e., an algorithm) configured for carrying out optimization functionality in accordance with the inventive disclosures made herein. In one embodiment, cache optimizer 420 is preferably configured for carrying out the optimization functionality of method 300 to optimize cached response information entries residing within dynamic cache 405. Accordingly, cache optimizer 420 is in effect a rule-based engine configured for parsing response information and removing non-essential instances of optimizable characters as defined by rules defined in the rules file 425.

In one embodiment, application server 400 comprises an IBM WebSphere Application Server equipped where IBM's DynaCache caching mechanism is an embodiment of dynamic cache 405. The DynaCache caching mechanism provides caching functionality for dynamic content of web container 410. Cache optimizer 420, and thus optimization functionality in accordance with the inventive disclosures made herein, is integrated into the DynaCache caching mechanism. The cache optimizer 420 optimizes the output retained within entries of the DynaCache Caching mechanism.

It will be appreciated that IBM's WebSphere Application Server is one example of application server 400. A skilled person will appreciate that optimization functionality and corresponding methodologies in accordance with the inventive disclosures made herein are not limited to IBM's WebSphere Application Server, but can easily encompass any number of other client-server architectures and systems that transmits data (i.e., response information) over some type of networks (e.g., LANs, WANs, etc) and that comprise some type of caching strategy for the data it is transmitting.

Referring now to computer readable medium, it will be understood by the skilled person that methods, processes and/or operations adapted for carrying out optimization functionality in accordance with the inventive disclosures made herein are tangibly embodied by computer readable medium having instructions thereon for carrying out such functionality. In specific embodiments, the instructions are tangibly embodied for carrying out method 100 or method 300 disclosed above to facilitate such optimization functionality. The instructions may be accessible by one or more data processors (e.g., a logic circuit of a data processing system providing server functionality) from a memory apparatus (e.g. RAM, ROM, virtual memory, hard drive memory, etc), from an apparatus readable by a drive unit of the data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon an algorithm (i.e., a set of instructions) adapted for carrying out optimization functionality in accordance with the inventive disclosures made herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for optimizing the size of a cached response information in a cache of a server, the cached response information being transmitted from the server to a requester computer, comprising:

accessing, by a processor, the cached response information, and determining whether the cached response information is already optimized;

when the cached response information is not already optimized, counting a number of idle processor cycles during a time interval;

when the number of idle processor cycles is below a predetermined threshold, implementing a character omission rule in the cached response information by performing steps comprising:

determining a specification of the cached response information, identifying, based on the specification, a character in the cached response information that does not affect an interpretation of the cached response information by the requester computer to form an optimizable character, and identifying, based on the specification, a valid removal condition for the optimizable character;

when the optimizable character meets the valid removal condition, removing the optimizable character from the cached response information to form an optimized response information;

designating the optimized response information as being optimized;

updating the cached response information with the optimized response information; and transmitting the cached response information to the requester computer.

* * * * *